United States Patent
Moreno

(10) Patent No.: US 6,449,975 B1
(45) Date of Patent: Sep. 17, 2002

(54) SELF TAPPING SPRAY NOZZLE FOR VEHICLE VENTILATION SYSTEM

(76) Inventor: Ramiro G. Moreno, 3422 Pine Brook, Costa Mesa, CA (US) 92626

( * ) Notice: Subject to any disclaimer, the term of this patent is extended or adjusted under 35 U.S.C. 154(b) by 0 days.

(21) Appl. No.: 09/904,273

(22) Filed: Jul. 11, 2001

(51) Int. Cl.[7] .................................................. F28D 5/00
(52) U.S. Cl. ........................................ 62/314; 239/271
(58) Field of Search .................. 62/314, 303; 239/271, 239/547, 548, 589

(56) References Cited

U.S. PATENT DOCUMENTS

| | | | | |
|---|---|---|---|---|
| 1,644,290 A | * | 10/1927 | Titcomb et al. | 169/70 |
| 2,993,650 A | * | 7/1961 | Bedberg | 239/271 |
| 4,037,791 A | * | 7/1977 | Mullett et al. | 138/45 |
| 4,676,319 A | * | 6/1987 | Cuthbertson | 169/62 |
| 5,737,937 A | * | 4/1998 | Akazawa | 165/95 |
| 6,003,783 A | * | 12/1999 | Hunter | 239/200 |
| 6,220,525 B1 | * | 4/2001 | McSherdon | 111/7.1 |

* cited by examiner

Primary Examiner—William E. Tapolcai
(74) Attorney, Agent, or Firm—Price and Gess

(57) ABSTRACT

A self tapping spray nozzle for use in a vehicle ventilation system is preferably made of stainless steel. The spray nozzle has a neck with an internal channel and threads cut into its outside surface. A wedge at a thirty degree angle, having sharpened edges is at the top of the neck. At least one port extends from the channel to the outside surface of the neck. A collar with a plurality of sides encompasses the circumference of the neck at its bottom. One side of the collar is aligned with the port to help align the port in a desired direction.

17 Claims, 2 Drawing Sheets

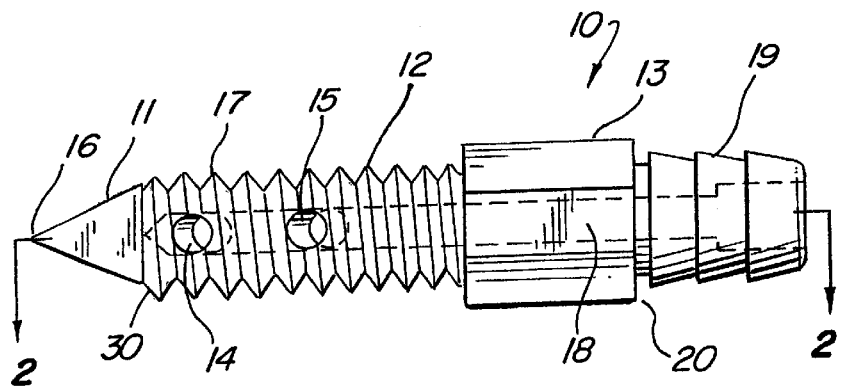 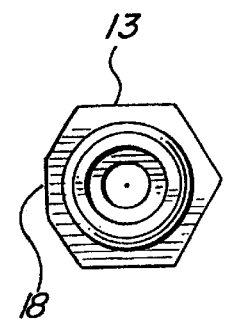
FIG. 1  FIG. 3
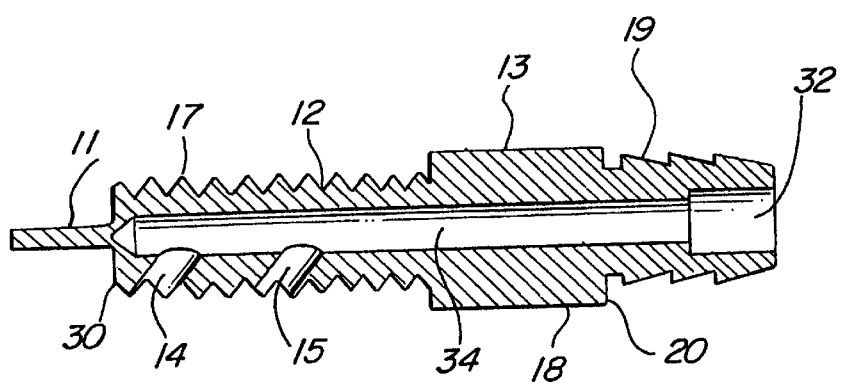 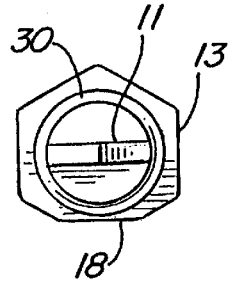
FIG. 2  FIG. 4

SELF TAPPING SPRAY NOZZLE FOR VEHICLE VENTILATION SYSTEM

BACKGROUND OF THE INVENTION

The present invention is a nozzle, in particular a spray nozzle that is part of a vehicle air conditioner system.

DESCRIPTION OF THE PRIOR ART

A vehicle ventilation system which includes an evaporator, experiences the build-up of dirt, debris, bacteria and fungus over time. The prior art has contemplated different ways of removing this bacteria and fungus from the evaporator in order to prevent offensive smells, dirt and debris, bacteria, and fungus from contaminating the passenger compartment of the vehicle. Typically, a variety of solutions and solvents are sprayed into the system or directly into the evaporator area. A system for cleaning the evaporator area is shown in U.S. Pat. No. 5,737,937.

This system requires inserting a spray nozzle into the duct work of the ventilation system. The procedure requires drilling a hole for the nozzle and the use of additional means such as glue or press-fit, for example, to hold the nozzle in place. The present invention provides a simplified procedure for installing a nozzle into the ventilation system.

SUMMARY OF THE INVENTION

The present invention is a self tapping spray nozzle for use in a vehicle ventilation system. The preferred embodiment of the spray nozzle comprises two ends separated by a neck with a channel inside. A wedge having a thirty degree angle and sharpened edges sits at the top of the neck. The neck has at least one port from the channel to the outside. The outer surface of the neck has threads cut into it. A collar with at least three sides encompasses the circumference of the neck at the bottom end. One side of the collar is aligned with the port and marked to indicate such an alignment.

BRIEF DESCRIPTION OF THE DRAWINGS

The objects and advantages of the invention will be readily appreciated as the same becomes better understood by reference to the following detailed description when considered in conjunction with the accompanying drawings in which like reference numerals designate like part throughout the figures thereof and wherein:

FIG. 1 is a side view of a preferred embodiment of the present invention;

FIG. 2 is a sectional view of a preferred embodiment of the invention, along line 2—2 of FIG. 1;

FIG. 3 is an end view of the preferred embodiment of the invention;

FIG. 4 is an alternate end view of the preferred embodiment of the invention.

DETAILED DESCRIPTION OF THE PREFERRED EMBODIMENTS

Figure 5:
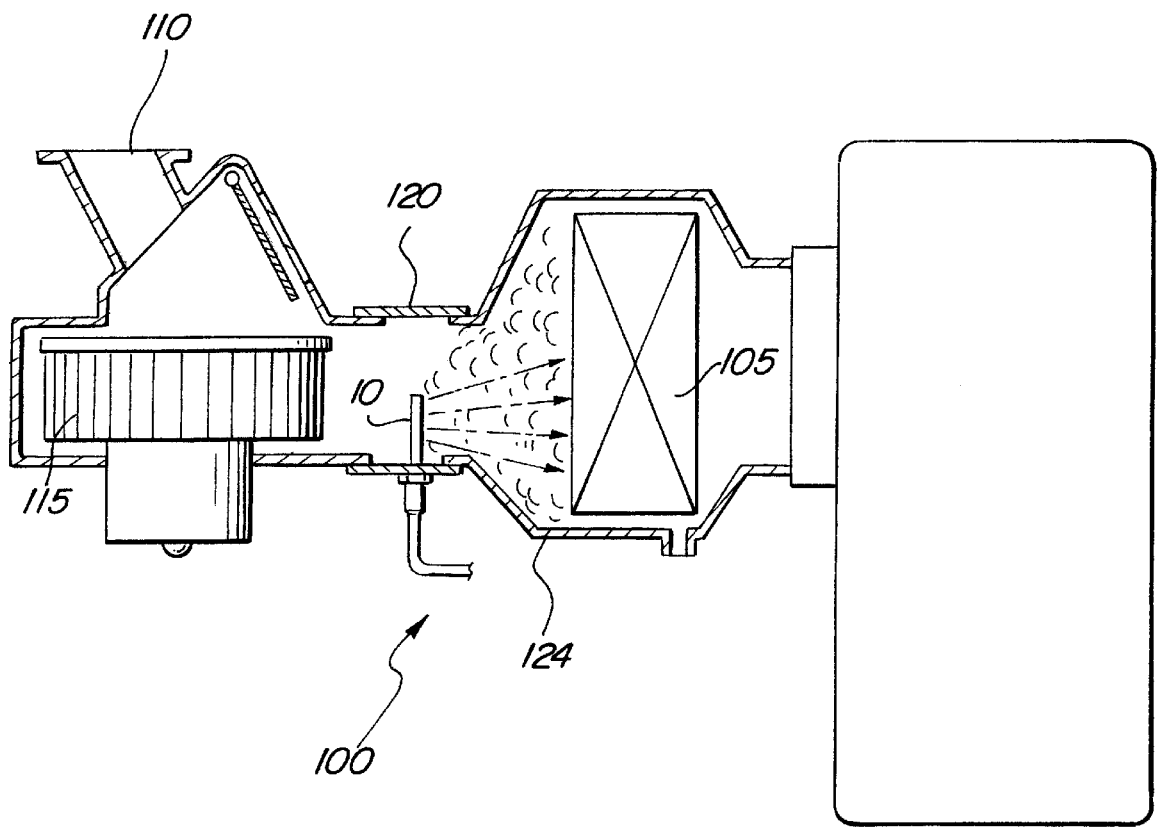
FIG. 5 is a cross-sectional view of a system with the nozzle of the present invention installed therein.

Referring first to FIG. 1, a preferred embodiment of the spray nozzle 10 of the present invention is shown. Preferably, the nozzle 10 is made of stainless steel or any other equivalent material, in order to provide greater resistance to the fluids and solvents used to clean or deodorize the ventilation system 100 and to provide sufficient strength to penetrate into the ventilation system. The nozzle 10 has a first end 20 at its bottom and a second end 30 at its top. The second end 30 has a wedge 11 attached to the top which facilitates insertion of the nozzle into a wall of the ventilation system 100 (FIG. 5) without first having to drill a hole into the wall. The wedge 11 comprises a twenty-five to forty-five degree angle, and is preferably at thirty degrees, with a sharp point 16 at a vertex of the wedge 11. The sharp point 16 and sides allow the spray nozzle 10 to penetrate the wall of the duct 120 or the wall of evaporator case 124 without having to use a drill to make a hole.

In the preferred embodiment, shown in FIGS. 1 and 2, the nozzle 10 has a neck 12 with a channel 34 inside the neck 12 that extends from the first end 20 to the second end 30. The channel 34 is capped at the second end 30 just under where the wedge 11 sits. The neck 12 contains at least two ports 14 and 15 that extend from the channel 34 to the exterior surface of the neck 12. Fluid coming into the nozzle or at the first end 20 is injected into the ventilation system 100 through ports 14, 15. Appropriate fluids for injecting into the system include detergents, deodorizers, disinfectants, antibacterial solutions, bactericides, fungicides, or other solvents. The ports 14 and 15 lie between the top of the neck, at the second end 30 and the collar 13. The neck 12 has threads 17 around its exterior from the collar 13 to the top 30 that permit the spray nozzle 10 to be threaded into a wall 120 or 124 of the ventilation system 100 after the wedge 11 has created a hole for insertion.

The collar 13 encompasses the circumference of the neck 12 at the first or bottom end 20. In the preferred embodiment, of FIGS. 1–4, the collar 13 is shaped as a truncated hexagon. One side of the collar 13 is aligned with the ports 14 and 15 and marked, by being flattened, as shown, for example, or in any other convenient way. After the nozzle 10 is threaded into the wall of the ventilation system 100, the nozzle 10 is aligned so that the ports 14, 15 face the evaporator 105. When fluid is injected into the bottom of nozzle 10 at the first end 20, any fluid exiting the ports 14 and 15 would then be sprayed directly at the evaporator 105.

As shown in FIG. 1, at the bottom first end 20 of the nozzle 10, an extension of the collar 13 includes a plurality of ridges 19, for receiving a flexible hose from a fluid source. Often, fluids used to clean or deodorize the evaporator 105 through the spray nozzle 10 come in containers that have a flexible hose which will slip over and be held by the ridges 19. The hose is connected to the first end 20 of the nozzle 10 by placing it over and around the ridges 19. Alternatively, for example, a valve stem (not shown) of a pressurized container could be inserted into a bore 32 of the first end 20. The bore 32 is larger in diameter than the channel 34 in the neck 12 in order to accommodate insertion of the valve stem from a fluid source.

A ventilation system 100 typically comprises an air intake port 110, a fan 115, a communication duct 120 made of a non-metallic material and an evaporator 105 within a metal case that acts as a heat exchanger. The sharpened wedge 11 of the nozzle allows the nozzle 10 to be easily inserted into the duct 120 or case 124 of the evaporator 105 of the ventilation system. The wedge is forced through the wall creating a hole, and then the collar 13 is turned with a wrench causing the threads 17 to drive the neck 12 of the nozzle 10 into the interior of the duct 120 up to the top of the collar 13. The nozzle 10 is positioned upstream from the evaporator 105 with the ports 14 and 15 facing the evaporator as indicated by the flattened surface 18 on the collar, so that the fluid can be sprayed into the evaporator 105. The collar 13 and/or the threads 17 secure the nozzle 10 to the duct wall 120 on the evaporator case 124. As shown in FIG. 5, the nozzle 10 is relatively short as compared to the internal overall height of the communication duct 120 and case 124. As a result, the fluid or solvent injected into the system will spread over the entire evaporator 105.

After the nozzle 10 is inserted, the bottom or first end 20 of the nozzle extends outside of the system, where it can be easily accessed. A pressurized fluid container may then be used to dispense fluid through a hose or directly from a nozzle on the container into the bottom first end 20 of the nozzle 10. The fluid is then ejected out ports 14 and 15, towards the evaporator 105. This placement of the nozzle 10 will clean the evaporator 105 efficiently. Regular cleaning will reduce the build-up of dirt and debris and reduces bacteria and fungus growth in the vehicle's ventilation system 100, increasing air flow and cooling.

What has been described is a self tapping spray nozzle for vehicle ventilation systems that provides for easy installation of the nozzle into the system.

What is claimed is:

1. A nozzle for a vehicle ventilation system, said nozzle comprising:
    a neck having a first and second end, a channel inside the neck extending from the first end towards the second end, and capped at the second end, said neck having treads on its exterior surface and a port extending from the channel to the exterior surface of the neck; and
    a collar at the first end of said neck having a channel therethrough communicating with the channel in the neck, attached to the neck for grasping and tuning the neck.

2. The nozzle of claim 1, further comprising a wedge at the second end of the neck.

3. The nozzle of claim 2, wherein the wedge comprises at least a 25 degree angle with a point at the vertex of the angle.

4. The nozzle of claim 2, wherein the wedge comprises a 30 degree angle with a point at the vertex of the angle.

5. The nozzle of claim 2, wherein the wedge has a sharpened edge.

6. The nozzle of claim 1, wherein the neck and collar are made of stainless steel.

7. The nozzle of claim 1, wherein the collar has at least three sides.

8. The nozzle of claim 7, wherein one side of the collar is aligned with the port.

9. The nozzle of claim 8, wherein the aligned side is marked.

10. The nozzle of claim 1, wherein the port in the neck is between the second end and the collar.

11. In combination with a vehicle ventilation system wherein an air intake port, a fan, a communication duct, and an evaporator are provided to cool the vehicle, the improvement therein comprising:
    a self tapping nozzle positioned upstream from the evaporator having a neck with a first and second end, a channel inside the neck extending from the first end towards the second end, capped at the second end with a point at the second end, said neck having threads on its exterior surface and at least one port extending from the channel to the exterior surface of the neck, and
    a collar at the first end of the neck having a channel therethrough communicating with the channel in the neck.

12. The system of claim 11, wherein the point on the neck comprises a wedge.

13. The system of claim 12, wherein the wedge comprises a 30 degree angle with a point as a vertex of the angle.

14. The system of claim 12, wherein the second end of the nozzle neck extends into the communication duct.

15. The system of claim 11, wherein said first end further comprises a plurality of external ridges extending beyond the collar.

16. The system of claim 11, wherein said collar has a bore therein larger in diameter than the channel in the neck.

17. The system of claim 11 where the collar has a plurality of sides with one side being aligned with the port.

* * * * *